US006779058B2

(12) United States Patent
Kishi et al.

(10) Patent No.: US 6,779,058 B2
(45) Date of Patent: Aug. 17, 2004

(54) METHOD, SYSTEM, AND PROGRAM FOR TRANSFERRING DATA BETWEEN STORAGE DEVICES

(75) Inventors: Gregory Tad Kishi, Oro Valley, AZ (US); Mark Allan Norman, Tucson, AZ (US); Jonathan Wayne Peake, Tucson, AZ (US); William Henry Travis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 09/904,976

(22) Filed: Jul. 13, 2001

(65) Prior Publication Data

US 2003/0014568 A1 Jan. 16, 2003

(51) Int. Cl.[7] .............................................. G06F 13/00
(52) U.S. Cl. ........................ 710/60; 711/112; 711/118; 711/135; 711/161; 707/204
(58) Field of Search ................. 711/112–115, 118–123, 711/135–146, 151–152, 161–169; 707/204; 710/31–35, 58–61; 369/47

(56) References Cited

U.S. PATENT DOCUMENTS

| 4,638,424 | A |   | 1/1987 | Beglin et al. |
|-----------|---|---|--------|----------------|
| 4,771,375 | A |   | 9/1988 | Beglin et al. |
| 5,121,479 | A | * | 6/1992 | O'Brien ........................ 710/34 |
| 5,276,892 | A | * | 1/1994 | Olesin et al. ............... 712/245 |
| 5,327,535 | A |   | 7/1994 | Ogata et al. |
| 5,333,319 | A |   | 7/1994 | Silen |

(List continued on next page.)

FOREIGN PATENT DOCUMENTS

| WO | 9501600 | 1/1995 |
|----|---------|--------|
| WO | 0004454 | 1/2000 |

OTHER PUBLICATIONS

IBM, Corp., "High Density DASD Dual–Copy Secondary to Multiple 3390 Primary Devices," technical Disclosure Bulletin, vol. 37, No. 06A, Jun. 1994, pp. 493–497.
Chiaverini, S. "Task–Priority Redundancy Resolution with Robustness to Algorithmic Singularities." in: Robot Control 1994 (Oxford, UK, 1995), vol. 1, pp. 393–399 (Abstract).
McNutt, D. "The Logical Volume Manager." *UNIX Review*,, vol. 15, No. 3 (Mar. 1997), pp. 63–65 (Abstract).
Meiseles, Y. "'Virtual Disks'—a System for Managing a Pool of Users' data sets." *Managements Datamatics*, vol. 5, No. 4 (Aug. 1976), pp. 165–169 (Abstract).
Bertossi, A.A., L.V. Mancini and F. Rossini. "Fault Tolerant Rate–Monotonic First–Fit Scheduling in Hard–Real–Time Systems." *IBEE Transactions on Parallel and Distributed Systems*, vol. 10, No. 9 (Sep. 1999), pp. 934–945 (Abstract).
U.S. patent application Ser. No. 09/391,188, filed on Sep. 7, 1999, entitled "Cache Storage Optimization in a Data Storage Libraries in a Redundant Copy Synchronization Token Tracking System."
U.S. patent application Ser. No. 09/391,186, filed on Sep. 7, 1999, entitled "Accessing Data Volumes From Data Storage Libraries in a Redundant Copy Synchronization Token Tracking System."

*Primary Examiner*—Christopher B. Shin
(74) *Attorney, Agent, or Firm*—Konrad Raynes & Victor LLP; David W. Victor (57) ABSTRACT

Provided is a method, system, and an article of manufacture for maintaining data accessible by a host in two storage devices, wherein the data is comprised of a plurality of data sets. A determination is made of a percentage of uncopied data at the first storage device, wherein uncopied data comprises data sets to be copied from the first storage device to the second storage device. If the calculated percentage is greater than a threshold amount, a rate at which uncopied data sets are transferred from the first storage device to the second storage device is increased.

45 Claims, 4 Drawing Sheets

U.S. PATENT DOCUMENTS

| | | | |
|---|---|---|---|
| 5,369,747 A | * 11/1994 | Muranoi | 711/158 |
| 5,418,925 A | * 5/1995 | DeMoss et al. | 711/114 |
| 5,546,557 A | 8/1996 | Allen et al. | |
| 5,640,530 A | * 6/1997 | Beardsley et al. | 711/113 |
| 5,926,834 A | * 7/1999 | Carlson et al. | 711/152 |
| 5,936,926 A | * 8/1999 | Yokouchi et al. | 369/47.33 |
| 5,971,281 A | 10/1999 | Frary et al. | |
| 6,009,484 A | 12/1999 | Miller | |
| 6,029,179 A | 2/2000 | Kishi | |
| 6,145,034 A | * 11/2000 | Bar | 710/60 |
| 6,272,589 B1 | * 8/2001 | Aoki | 711/112 |
| 6,463,513 B1 | * 10/2002 | Bish et al. | 711/161 |
| 6,467,024 B1 | * 10/2002 | Bish et al. | 711/114 |

* cited by examiner

METHOD, SYSTEM, AND PROGRAM FOR TRANSFERRING DATA BETWEEN STORAGE DEVICES

BACKGROUND OF THE INVENTION

1. Field of the Invention

The present invention relates to a system, method, and program for copying data from one virtual tape server to another virtual tape server in a peer-to-peer environment.

2. Description of the Related Art

In prior art virtual tape storage systems, hard disk drive storage is used to emulate tape drives and tape cartridges. In this way, host systems performing input/output (I/O) operations with respect to tape are in fact performing I/O operations with respect to a set of hard disk drives emulating the tape storage. In the prior art International Business Machines (IBM) Magstar Virtual Tape Server, one or more virtual tape servers ("VTS") are each integrated with a tape library comprising numerous tape cartridges and tape drives, and have a direct access storage device (DASD) comprised of numerous interconnected hard disk drives. The operation of the virtual tape server is transparent to the host. The host makes a request to access a tape volume. The virtual tape server intercepts the tape requests and accesses the volume in the DASD. If the volume is not in the DASD, then the virtual tape server recalls the volume from the tape drive to the DASD. The virtual tape server can respond to host requests for volumes in tape cartridges from DASD substantially faster than responding to requests for data from a tape drive. Thus, the DASD functions as a tape volume cache for volumes in the tape cartridge library.

Two virtual tape servers can be combined to create a peer-to-peer virtual tape server. In a peer-to-peer virtual tape server, two virtual tape servers, each integrated with a separate tape library, can provide access and storage for the same data volumes (i.e. peer-to-peer environment). By providing two virtual tape server subsystems and two libraries, if an operation to recall a file from one virtual tape server subsystem and tape library fails, then the file may still be recalled from the other virtual tape server subsystem and tape library. This redundant architecture provides greater data and tape availability and improved data shadowing in the event a tape or VTS in one subsystem is damaged. Therefore, when a host system writes to the storage device, the data will be saved on both virtual tape servers. However, rather than writing to both virtual tape servers simultaneously, which would be a drain on system resources, a virtual tape controller connecting the two virtual tape servers will write the logical volume to only one of the virtual tape servers (an example of a virtual tape controller is the IBM AX0 Virtual Tape Controller ("AX0 VTC") which acts as an intelligent switch between the two virtual tape servers). Then, the logical volume is copied by the virtual tape controller from one virtual tape server to the other virtual tape server.

The synchronization process between the virtual tape servers can occur immediately or be deferred based on user preferences. Often a host user will set the backup process to occur at a later time for companies that operate on a cyclical basis. For example, a brokerage firm may desire higher peak host input/output performance during trading hours (and not have the backup process slow down their computers), and chose to defer the backup process between the two virtual tape servers until the trading day has ended. In addition, the IBM Peer-to-Peer Virtual Tape Server would operate in deferred mode if one of the VTS subsystems fail.

In operating a virtual tape server, especially one that has a lot of host write activity, space in the VTS DASD cache needs to be continually made available for newly written volumes. However, when operating in deferred mode, if too much data is stored in the DASD before the copy operation is performed, uncopied data may be deleted before being copied to the other virtual tape server, where the oldest data is deleted first regardless of whether the data was copied or not. In such cases, the only copy of the data will exist on a physical tape in the tape library, however, copying the data to the other virtual tape server from a tape drive causes large delays in the copy process. The penalty for a tape drive recall is slightly over a factor of ten in copy throughput. This factor of ten penalty is so severe on the IBM Peer-to-Peer Virtual Tape Server, that if all the logical volumes were on tape, the copy process could never "catch-up" to the host. Thus, there is a need in the art for improved mechanisms for copying data from one virtual tape server to another in the deferred mode.

SUMMARY OF THE PREFERRED EMBODIMENTS

Provided is a method, system, and an article of manufacture for maintaining data accessible by a host in two storage devices, wherein the data is comprised of a plurality of data sets. A determination is made of a percentage of uncopied data at the first storage device, wherein uncopied data comprises data sets to be copied from the first storage device to the second storage device. If the calculated percentage is greater than a threshold amount, a rate at which uncopied data sets are transferred from the first storage device to the second storage device is increased.

In further implementations, the threshold amount is a first threshold amount. If the calculated percentage is greater than a second threshold amount, further increasing a rate at which uncopied data sets are transferred from the first storage device to the second storage device.

Still further, the rate at which uncopied data sets are transferred is increased by increasing a priority associated with the uncopied data sets being transferred between the first and second storage devices. The priority is used to determine a rate in which Input/Output requests, including the requests to transfer the uncopied data sets, are processed.

Still further, the rate at which uncopied data sets are transferred is further increased in response to the percentage exceeding the second threshold by lowering a priority at which Input/Output (I/O) requests from a host to the first storage device are processed. The priority is used to determine a rate in which Input/Output requests, including the requests to transfer the uncopied data and host I/O requests, are processed. The described implementations provide a technique for managing operations to transfer uncopied data sets between first and second storage devices, where data sets in the first storage device are mirrored in the second storage devices. The described implementations provide one or more throttles to increase the rate at which the uncopied data sets are transferred depending on the percentage of uncopied data sets in the first storage device reaching one or more thresholds. The rate of transferring the uncopied data sets is increased to prevent the uncopied data sets from consuming undesirable amounts of the first storage device space and to prevent uncopied data from deletion from the cache. The thresholds can be a function of the size of the storage device.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
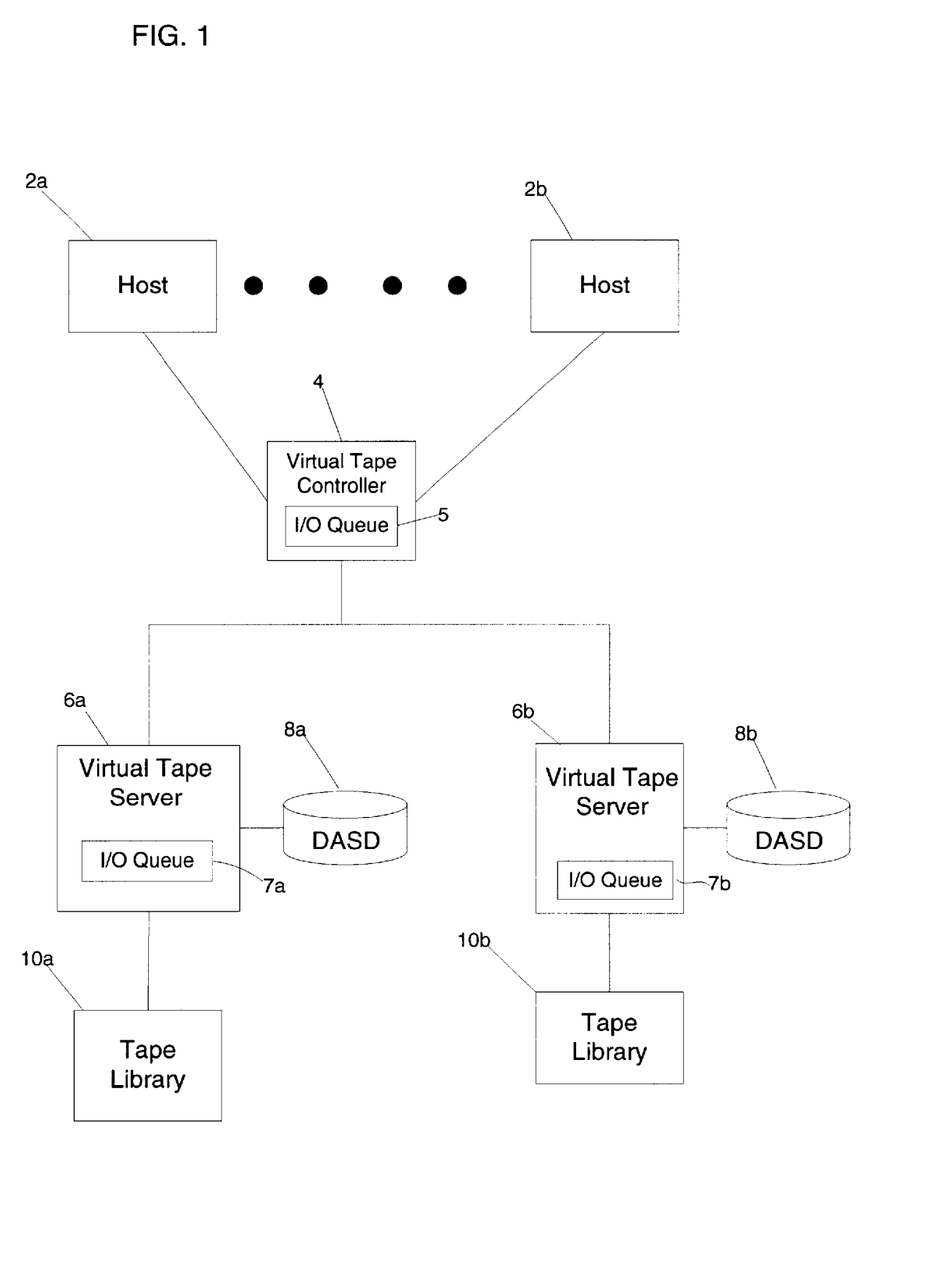
FIG. 1 is a block diagram illustrating a computing environment in which aspects of the invention are implemented.

FIG. 1 illustrates a peer-to-peer computing environment utilizing two virtual tape servers. Additional virtual tape servers can be used by a system, but for purposes of illustration, a single peer-to-peer arrangement is shown. A plurality of host computers 2a, b (two host computers 2a, b are shown for illustration purposes) connect to a virtual tape controller 4 ("VTC"). The host computers 2a, b may connect to the VTC 4 through a channel, such as the Enterprise System Connection (ESCON)** channel. In the peer-to-peer environment, the virtual tape controller 4 is transparent to the host computers 2a, b (i.e. the host system acts as if the host computers 2a, b are writing to a single virtual tape server). The virtual tape controller 4 then routes I/O requests from the hosts 2a, b to one of the virtual tape servers 6a or 6b. The virtual tape controller 4 includes an I/O queue 5 in which it queues I/Os to route among the virtual tape servers 6a, b and hosts 2a, b, using I/O priority queuing techniques known in the art. Each virtual tape servers 6a, b includes an I/O queue 7a, b in which I/O requests being transferred between the other virtual tape server 6a, b or the hosts 2a, b are queued using I/O priority queuing techniques known in the art. In addition, the virtual tape servers 6a and 6b control access to direct access storage devices (DASD) 8a and 8b and tape libraries 10a and 10b, respectively.

**AIX, ESCON, Magstar, and RS/6000 are registered trademarks of IBM.

Each DASD 8a, b comprises numerous interconnected hard disk drives. Each tape library 10a, b comprises numerous tape cartridges which may be mechanically loaded into tape drives that the virtual tape servers 6a, b may access. The hosts may include an operating system such as the IBM OS/390 operating system, or any other operating system known in the art. The virtual tape servers 6a or 6b may comprise a server system including software to emulate a tape library, such as the IBM Magstar Virtual Tape Server. For instance, the virtual tape servers 6a, b and the virtual tape controller 4 may be implemented in separate computers comprising an IBM RS/6000 processor, the IBM AIX operating system, and the IBM ADSTAR Distributed Management (ADSM) software or Tivoli Storage Manager, to perform the data movement operations among the hosts 2a, b, DASDs 8a, b, and tape libraries 10a, b.** The tape library may comprise an IBM Magstar Tape Library, such as the Magstar 3494 Tape Library, or any other tape library system known in the art.

The DASDs 8a, b provide a tape volume cache, which extends the performance benefits of disk cache to access the volumes in the tape libraries 10a, b and improves performance by allowing host I/O requests to the tape libraries 10a, b to be serviced from the DASDs 8a, b. The virtual tape servers 6a, b appear to the hosts 2a, b as tape drives including tape data volumes. The hosts 2a, b view the virtual tape volumes as actual tape volumes and issue tape management commands, such as mount, and otherwise address the virtual tape servers 6a, b as a tape control unit. Further details of the virtual tape server technology in which preferred embodiments are implemented are described in the IBM publication "Enhanced IBM Magstar Virtual Tape Server: Implementation Guide." IBM document no. SG24-2229-02 (Copyright IBM, April, 1999), which publication is incorporated herein by reference in its entirety.

Volumes maintained in tape cartridges in the tape library 10a, b are logical volumes. A copy of the logical volume can also reside in the DASD 8a, b associated with the virtual tape servers 6a, b. A host 2a, b accesses the data on a logical volume from the resident copy on the DASD 8a, b. If the DASD 8a, b resident copy is updated by a host 2a, b, the logical volume is scheduled to be copied from the DASD 8a, b to the tape library 10a, b when the volume is closed by the host 2a, b and is flagged as uncopied data that must be copied to the other virtual tape server 6a, b. Further, after the DASDs 8a, b space usage reaches a threshold amount, the virtual tape server 6a, b removes logical volumes that have been copied to the tape library 10a, b from the DASD 8a, b to make room for other logical volumes. Once a logical volume has been removed from the DASD 8a, b, it is no longer accessible by a host. If a host 2a, b requests a volume that only resides on tape, then the volume must be recalled and copied from a tape in the tape library 10a, b to the DASDs 8a, b. Recall operations can take several minutes and may include mechanical operations concerning the use of a robotic arm to access tape cartridges from the storage cells and insert into a tape drive, mounting the tape cartridge, rewinding the tape, etc. In preferred embodiments, the tape libraries 10a, b include the same logical volumes, thus shadowing each other. However, each virtual tape server 6a,b behaves independently, and each may cache different volumes in DASD. For instance, the virtual tape servers 6a, b may have different volumes resident in their associated DASDs 8a, b as a result of different schedules or algorithms that determine which volumes to remove.

As long as a logical volume is still resident in the DASDs 8a, b, it can be accessed again by a host regardless of whether it has been copied to the tape library 10a, b or not. By allowing a volume to be mounted and accessed from DASDs 8a, b, delay times associated with rewinding the tape, robotic arm movement, and load time for the mounts are avoided because the operations are performed with respect to hard disk drives that do not have the delay times associated with tape access mechanisms. Performing a virtual mount of a logical volume resident in DASD 8a, b is referred to as a cache hit.

Figure 2:
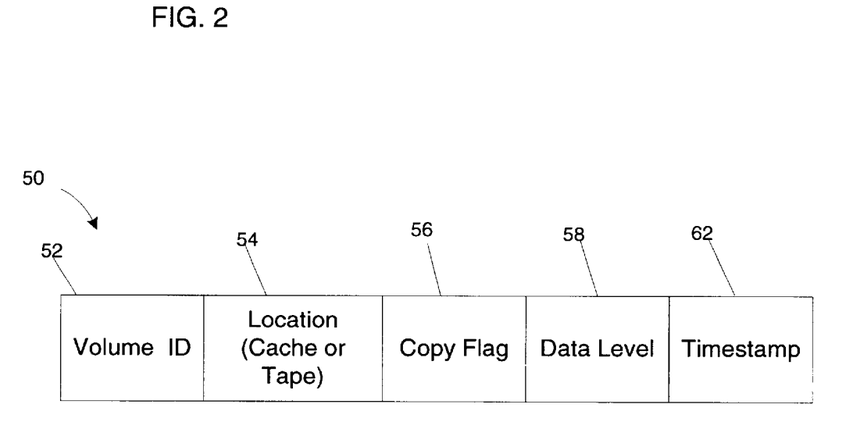
FIG. 2 illustrates a token database record used to access data in accordance with implementations of the invention.

Each virtual tape server 6a, b includes a database of tokens or records for every logical volume in the tape library 10a, b to manage the volumes in the virtual tape servers 6a, b. FIG. 2 illustrates the fields or data maintained in each volume token 50. The volume ID 52 indicates the identity of the volume. A location field 54 indicates whether the volume is in the DASD 8a, b of the virtual tape server 6a, b or only in the tape library 10a, b. The location field 54 would indicate that a volume is in the DASD 8a, b even if it scheduled for destage. A copy flag 56 indicates whether the data has been copied to the other virtual tape server in the peer-to-peer environment. The copy flag 56 is set "on" for a logical volume in one virtual tape server 6a if the other virtual tape server 6b needs to copy the logical volume to its DASD 8b. After a logical volume has been copied from one virtual tape server 6a, the copy flag 56 is set "off" again. A data level 58 indicates the number of times the file has been updated. Every time data is updated to a logical volume, the level field 58 is incremented indicating the number of times a volume in a particular DASD 8a, b has been updated. The logical volume in the DASDs 8a, b having the highest data level includes the most recent version of the update. For this reason, the virtual tape server 6a, b including the most recent version of the data, i.e., having the highest level, will be selected when performing I/O operations with respect to the volume. A timestamp 62 records the last time the logical volume was accessed by the host computers 2a, b.

Figure 3:
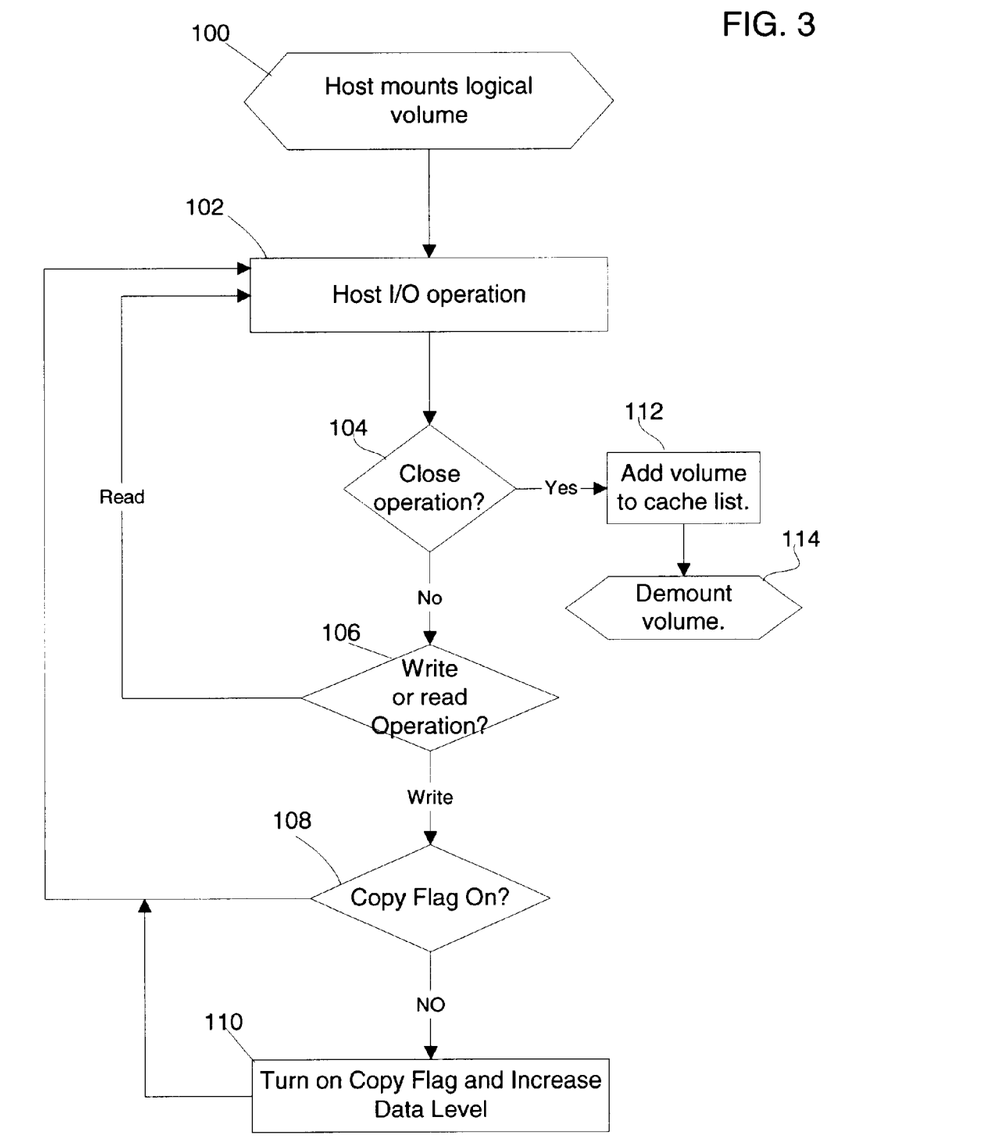
FIG. 3 illustrates logic to identify uncopied files in the cache in accordance with implementations of the invention.

FIG. 3 illustrates logic to identify uncopied files in the cache in accordance with preferred embodiments of the present invention. Typically, each virtual tape controller 4 tracks the usage of logical volumes by the host 2a or b. Whenever a logical volume is first modified after being mounted by the host computer 2a, b, the virtual tape controller 4 updates the data level 58. Whenever a logical volume is closed by the host computer, the virtual tape server 6a or b adds it to its cache list. The virtual tape server 6a or b uses this cache list to manage the volumes in its DASD cache 8a or b (i.e. determine whether the volume should be destaged). The virtual tape server 6a or b determines which volumes are kept in the cache the longest using a cache management algorithm such as Least Recently Used ("LRU"). This algorithm is based upon the timestamp 62 of the last access of the logical volume. Volumes with the oldest timestamps are deleted from the DASD cache 8a or b first whenever space is needed in the virtual tape server 6a or b. This ensures that least recently used volumes are deleted from DASD cache 8a or b, before the more recently accessed volumes.

Control begins at block 100, when a host computer 2a or b causes a logical volume to be mounted by the virtual tape server 6a, b. The host issues an I/O operation to the virtual tape controller 4 at block 102. At block 104, the virtual tape server 6a, b determines whether the I/O operation is a volume close operation. If so, then the volume is added (at block 112) to the cache list and then the volume is demounted (at block 114). If the I/O operation is not a volume close, then the virtual tape controller 4 determines (at block 106) whether the I/O operation is a read or write operation. If the operation is simply a read operation, the virtual tape controller 4 continues to monitor the host's I/O activities. If the operation is a write operation, then the virtual tape controller 4, at block 108 determines whether the copy flag 56 is "on" in the volume's token 50. If the copy flag 56 is "not on," the virtual tape controller 4 (at block 110) turns the flag "on" and also increments the data level 58 for a write operation. The virtual tape controller 4 then waits for the next host I/O operation. By verifying that a copy flag is turned on after every write, the virtual tape controller 4 ensures that a newly written volume is marked for copying.

Figure 4:
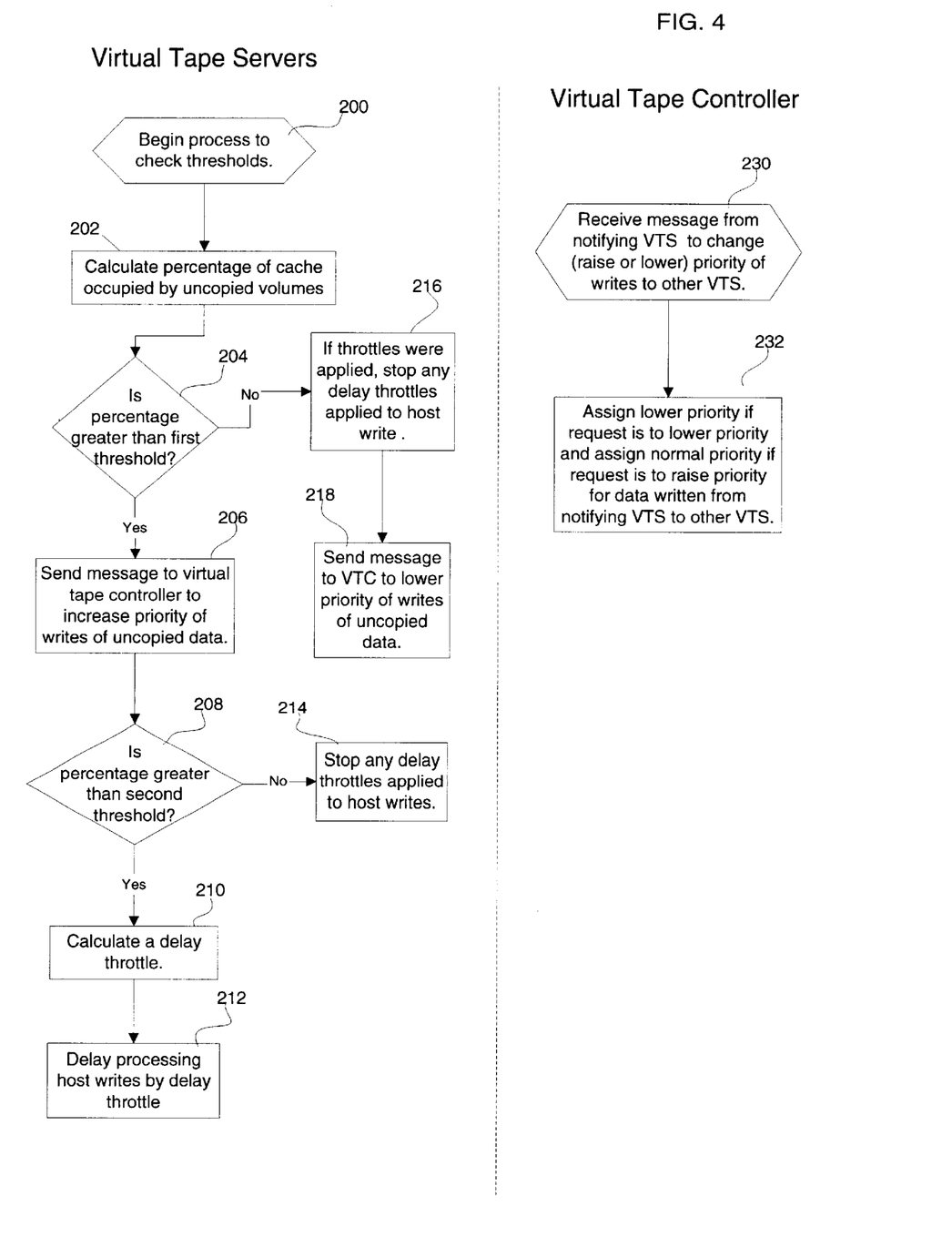
FIG. 4 illustrates logic to alter the priority of requests to copy uncopied data in accordance with implementations of the invention.

FIG. 4 illustrates logic implemented in the controller 4 and virtual tape servers 6a, b to alter the priority of requests to copy uncopied data in accordance with implementations of the invention. The virtual tape servers 6a, b would have initiated synchronization operations to copy uncopied data sets therebetween. Initially, the virtual tape controller 4 assigns a low priority to writes of uncopied data from one virtual tape server 6a, b to give preference to the I/Os from the hosts 2a, b. Blocks 200 through 218 illustrate logic implemented in each of the virtual tape servers 6a, b and blocks 230 and 232 illustrate logic implemented in the virtual tape controller 4.

At block 200, the virtual tape servers 6a, b begin a process to check thresholds to determine the extent of uncopied data in the DASD 8a, b. The virtual tape server 6a, b calculates (at block 202) a percentage of the DASD cache 8a or b that is occupied by uncopied volumes (i.e. volumes where the copy flag 56 is "on"), i.e., by dividing the storage space used by the uncopied data sets by the total DASD 8a, b storage space.

The virtual tape servers 6a, b consider two different thresholds with respect to the uncopied volumes to determine the action to take to increase the rate at which uncopied volumes are transferred to the other virtual tape server 6a, b to free the DASD 8a, b of this uncopied data. The first threshold would be a first alert to take one degree of action and the second threshold would comprise a second higher alert to further increase the rate at which uncopied volumes are copied over should the percentage of uncopied volumes in the DASD cache 8a, b increase even after the actions are taken for the first threshold.

If (at block 204) the calculated percentage of uncopied data on the DASD 8a, b exceeds the first threshold, then the virtual tape server 6a, b sends a message (at block 206) to the virtual tape controller 4 to increase the priority of writes of uncopied data. If (at block 208) the calculated percentage of uncopied data on the DASD 8a, b is greater than the second threshold, then the actions taken at the first threshold were not sufficient to keep the percentage of uncopied data from exceeding the second threshold. In such case, the virtual tape server 6a, b determines (at block 210) a delay throttle. The virtual tape server 6a, b would then delay processing (at block 212) host 2a, b write operations to the DASD 8a, b by the amount of time specified by the delay throttle. The delay throttle may comprise a predefined value or be dynamically calculated based on the extent of the amount of uncopied data in the DASD 8a, b. By delaying processing of host writes by the delay throttle, the virtual tape server 6a, b provides additional resources to write uncopied volumes in the DASD cache 8a, b to the other virtual tape server 6a, b by delaying the processing of the host writes in the virtual tape server 6a, b I/O queue 7a, b.

In one implementation, the delay throttle (T) may be calculated by:

$$T=(Y-T2)*0.04 \text{ in seconds,}$$

where Y is the percentage of the DASD cache 8a, b occupied by uncopied volumes. Thus, when Y is 50% and T2 is 50%, the throttle is zero, and when Y is 100% and T2 is 50%, the throttle is set to two seconds. The virtual tape server 6a, b may limit the delay throttle (T) by some maximum time to avoid to lengthy delays.

Moreover, in certain implementations, the thresholds may be a function of the size of the storage device, such that larger DASD caches would have a higher threshold.

If (at block 208) the second threshold is not exceeded, then the virtual tape server 6a, b stops (at block 214) any delay throttles applied to host writes as the second threshold of the percentage uncopied volumes in the DASD 8a, b is no longer applicable. If (at block 204) the first threshold is not exceeded, i.e., the percentage of uncopied volumes is less than the first threshold, then the virtual tape server 6a, b stops (at block 216) any delay throttles applied to host writes in the virtual tape server 6a, b I/O queue 7a, b and sends (at block 218) a message to the virtual tape controller 4 to return to processing uncopied data to the other virtual tape server 6a, b at the lower priority. In this way, the virtual tape server 6a, b takes action to remove both throttles when the first threshold is no longer exceeded.

At block 230, the virtual tape controller 4 receives a message from one notifying virtual tape server 6a, b of a change in the priority for writes to the other virtual tape server 6a, b. This change in priority may specify to increase the priority at block 206 or lower the priority (at block 218) to the default lower priority the virtual tape controller 4 assigns to writes between the virtual tape servers 6a, b. At block 232, the virtual tape controller 4 assigns the lower priority if the request is to lower the priority and raises the priority of writes from the notifying virtual tape server 6a, b to the other virtual tape server 6a, b to a normal priority if the request is to raise the priority.

Once a volume is copied, the virtual tape controller 4 turns the copy flag 56 in the token 50 (FIG. 2) to "off" indicating the volume does not need to be copied anymore, and the virtual tape servers 6a, b continue to recalculate the percentage of the DASD cache 8a, b occupied by uncopied volumes (at block 202).

With the described logic of FIG. 4 two different throttles are used to attempt to increase the rate at which uncopied data is transferred from one virtual tape server 6a, b to the other depending on two different thresholds of the percentage of uncopied data in the DASD 8a, b. The first throttle operates by affecting the priority the virtual tape controller 4 uses to route writes between the virtual tape servers 6a, b and the second throttle operations by affecting the priority the virtual tape server 6a, b assigns to I/O requests in its won I/O queue 7a, b.

Additional Implementation Details

This concludes the description of the preferred embodiments of the invention. The following describes some alternative embodiments for accomplishing the present invention. The technique for keeping uncopied files in the virtual tape servers described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, two threshold were discussed that triggered to different throttling techniques to increase the rate at which uncopied data in the DASDs 8a, b are copied over to the other DASD 8a, b. In alternative implementations, additional thresholds may be applied and alternative throttling techniques may be used to increase the rate at which uncopied data is transferred between DASDs 8a, b by affecting the rate at which the virtual tape controller 4 and/or the virtual tape servers 6a, b process writes of uncopied data in their I/O queues 5, 7a, b.

Preferred embodiments were described with respect to the IBM virtual tape server system. However, the preferred logic could apply to any virtual storage system in which a faster storage system, including either magnetic storage or memories, is used to cache data from a slower storage system. For instance, the cache may comprise memory devices and the storage devices may comprise sets of hard disk drives whose data sets are paged into the corresponding memory sets to provide access to the data sets through the faster access cache. Moreover, although the preferred embodiments were described with respect to a peer-to-peer environment, the preferred logic could apply to other environments such as a client-server environment where copies of the same data is kept at both locations. In addition, the preferred logic could apply to a situation where a copy of the logical volume can be kept in multiple storage devices. For example, the logic can apply in a peer-to-peer-to-peer environment with three separate virtual tape servers where the same logical volume is copied to each virtual tape server.

Although the preferred embodiments was described with reference to when the copy process is performed in deferred mode, the preferred logic is also effective in the immediate mode to prevent uncopied files from being deleted from the cache. In addition, although the preferred mode of controlling the speed of the copying was discussed with issuing priorities to the copying or writing requests, other means of controlling the speed include sending messages to the host system to backup the system before proceeding, diverting more system resources for the copy process, slowing down other host operations, etc.

Preferred embodiments were described with respect to recalling, mounting, and maintaining tokens for data volumes. However, any data set or unit of data storage such as files, tracks, fixed blocks, etc., could be the subject of the recalling and mounting operations. The term "data set" as used herein refers to any unit of data storage.

In preferred embodiments, virtual tape controllers were used to select a virtual tape server to handle the recall or I/O access operation. In alternative embodiments, the hosts may make such a selection, or the virtual tape servers may determine which virtual tape server to use to handle the recall or access operation.

In the above described implementations, certain operations were discussed as performed by the virtual tape controller and the virtual tape server. In alternative implementations, certain of the operations described with respect to the virtual tape controller may be performed by the virtual tape server, and vice versa.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for maintaining data accessible by a host in a first and second storage devices, wherein the data is comprised of a plurality of data sets, comprising:

determining a percentage of uncopied data in the first storage device, wherein uncopied data comprises data sets to be copied from the first storage device to the second storage device; and if the determined percentage is greater than a threshold amount, increasing a rate at which uncopied data sets are transferred from the first storage device to the second storage device.

2. The method of claim 1, further comprising:

indicating a data set in the first storage device as uncopied when the data set is modified or newly created.

3. The method of claim 1, wherein the threshold amount is a first threshold amount, further comprising:

if the calculated percentage is greater than a second threshold amount, further increasing a rate at which uncopied data sets are transferred from the first storage device to the second storage device.

4. A method for maintaining data accessible by a host in a first and second storage devices, wherein the data is comprised of a plurality of data sets, comprising:

determining a percentage of uncopied data in the first storage device, wherein uncopied data comprises data sets to be copied from the first storage device to the second storage device; and if the determined percentage is greater than a threshold amount, by increasing a priority associated with the uncopied data sets being transferred between the first and second storage devices, wherein the priority is used to determine a rate in which Input/Output requests, including the requests to transfer the uncopied data sets, are processed.

5. The method of claim 4, wherein a controller transfers uncopied data sets from the first storage device to the second storage device, wherein increasing the priority associated with the uncopied data sets being transferred comprises the controller increasing the priority at which the controller transfers uncopied data sets from the first storage device to the second storage device.

6. The method of claim 5, further comprising:

sending a message to the controller in response to detecting that the calculated percentage exceeds the first threshold to increase the priority associated with the uncopied data sets, wherein the controller increases the priority at which uncopied data sets are transferred from the first storage device to the second storage device in response to the message.

7. The method of claim 5, wherein the controller increases the priority associated with uncopied data sets by increasing the priority from a lower priority to a higher priority.

8. The method of claim 7, further comprising:

lowering, with the controller, the priority associated with uncopied data sets from the higher priority to the lower priority when the percentage of uncopied data sets in the first storage device falls below the first threshold.

9. The method of claim 8, further comprising:

sending a message to the controller in response to detecting that the calculated percentage is less than the first threshold to lower the priority associated with the uncopied data sets, wherein the controller lowers the priority at which uncopied data sets are transferred from the first storage device to the second storage device in response to the message.

10. A method for maintaining data accessible by a host in a first and second storage devices, wherein the data is comprised of a plurality of data sets, comprising:

determining a percentage of uncopied data in the first storage device, wherein uncopied data comprises data sets to be copied from the first storage device to the second storage device; and if the determined percentage is greater than a first threshold amount, increasing a rate at which uncopied data sets are transferred from the first storage device to the second storage device;

if the calculated percentage is greater than a second threshold amount, lowering a priority at which Input/Output (I/O) requests from a host to the first storage device are processed, wherein the priority is used to determine a rate at which Input/Output requests, including the requests to transfer the uncopied data and host I/O requests, are processed.

11. The method of claim 10, wherein a first controller manages I/O requests to the first storage device, wherein lowering the priority at which I/O requests from the host to the first storage device are processed is performed by the first controller.

12. The method of claim 11, wherein the first controller lowers the priority of host write I/O requests and not host read I/O requests.

13. The method of claim 11, wherein the first controller lowers the priority by delaying processing host I/O requests for a delay time.

14. The method of claim 13, further comprising:

dynamically calculating the delay time that is used to delay processing host I/O requests.

15. The method of claim 14, wherein the delay time is dynamically calculated as a function of the percentage of uncopied data sets in the first storage device.

16. A system for maintaining a plurality of data sets accessible to a host, comprising:

a first and second storage devices including the data sets;

means for determining a percentage of uncopied data in the first storage device, wherein uncopied data comprises data sets to be copied from the first storage device to the second storage device; and means for increasing a rate at which uncopied data sets are transferred from the first storage device to the second storage device if the determined percentage is greater than a threshold amount.

17. The system of claim 16, further comprising:

means for indicating a data set in the first storage device as uncopied when the data set is modified or newly created.

18. The system of claim 16, wherein the threshold amount is a first threshold amount, further comprising:

means for increasing a rate at which uncopied data sets are transferred from the first storage device to the second storage device if the calculated percentage is greater than a second threshold amount.

19. A system for maintaining a plurality of data sets accessible to a host, comprising:

a first and second storage devices including the data sets;

means for determining a percentage of uncopied data in the first storage device, wherein uncopied data comprises data sets to be copied from the first storage device to the second storage device; and means for increasing a priority associated with the uncopied data sets being transferred between the first and second storage devices if the determined percentage is greater than a threshold amount, wherein the priority is used to determine a rate at which Input/Output requests, including the requests to transfer the uncopied data sets, are processed.

20. The system of claim 19, further comprising:

a controller that transfers uncopied data sets from the first storage device to the second storage device, wherein the means for increasing the priority associated with the uncopied data sets being transferred is implemented by the controller increasing the priority at which the controller transfers uncopied data sets from the first storage device to the second storage device.

21. The system of claim 20, further comprising:

means for sending a message to the controller in response to detecting that the calculated percentage exceeds the first threshold to increase the priority associated with the uncopied data sets, wherein the controller increases the priority at which uncopied data sets are transferred from the first storage device to the second storage device in response to the message.

22. The system of claim 20, wherein the controller increases the priority associated with uncopied data sets by increasing the priority from a lower priority to a higher priority.

23. The system of claim 22, further comprising:

means, performed by the controller, for lowering the priority associated with uncopied data sets from the higher priority to the lower priority when the percentage of uncopied data sets in the first storage device falls below the first threshold.

24. The system of claim 23, further comprising:

means for sending a message to the controller in response to detecting that the calculated percentage is less than the first threshold to lower the priority associated with the uncopied data sets, wherein the means performed by the controller that lowers the priority at which uncopied data sets are transferred from the first storage device to the second storage device lowers the priority in response to the message.

25. A system for maintaining a plurality of data sets accessible to a host, comprising:

a first and second storage devices including the data sets;

means for determining a percentage of uncopied data in the first storage device, wherein uncopied data comprises data sets to be copied from the first storage device to the second storage device; and means for increasing a rate at which uncopied data sets are transferred from the first storage device to the second storage device if the determined percentage is greater than a first threshold amount;

means for lowering a priority at which Input/Output (I/O) requests from a host to the first storage device are processed if the calculated percentage is greater than a second threshold amount, wherein the priority is used to determine a rate at which Input/Output requests, including the requests to transfer the uncopied data and host I/O requests, are processed.

26. The system of claim 25, further comprising:

a first controller managing I/O requests to the first storage device, wherein the means for lowering the priority at which I/O requests from the host to the first storage device are processed is performed by the first controller.

27. The system of claim 26, wherein the first controller includes means for lowering the priority of host write I/O requests and not host read I/O requests.

28. The system of claim 26, wherein the means performed by the first controller for lowering the priority by delaying processing host I/O requests for a delay time.

29. The system of claim 28, further comprising:

means for dynamically calculating the delay time that is used to delay processing host I/O requests.

30. The system of claim 29, wherein the delay time is dynamically calculated as a function of the percentage of uncopied data sets in the first storage device.

31. An article of manufacture including code for maintaining data accessible by a host in a first and second storage devices, wherein the data is comprised of a plurality of data sets by:

determining a percentage of uncopied data in the first storage device, wherein uncopied data comprises data sets to be copied from the first storage device to the second storage device; and if the determined percentage is greater than a threshold amount, increasing a rate at which uncopied data sets are transferred from the first storage device to the second storage device.

32. The article manufacture of claim 31, further comprising:

indicating a data set in the first storage device as uncopied when the data set is modified or newly created.

33. The article manufacture of claim 31, wherein the threshold amount is a first threshold amount, further comprising:

if the calculated percentage is greater than a second threshold amount, further increasing a rate at which uncopied data sets are transferred from the first storage device to the second storage device.

34. An article of manufacture including code for maintaining data accessible by a host in a first and second storage devices, wherein the data is comprised of a plurality of data sets by:

determining a percentage of uncopied data in the first storage device, wherein uncopied data comprises data sets to be copied from the first storage device to the second storage device; and if the determined percentage is greater than a threshold amount, increasing a priority associated with the uncopied data sets being transferred between the first and second storage devices, wherein the priority is used to determine a rate at which Input/Output requests, including the requests to transfer the uncopied data sets, are processed.

35. The article manufacture of claim 34, wherein a controller transfers uncopied data sets from the first storage device to the second storage device, wherein increasing the priority associated with the uncopied data sets being transferred comprises the controller increasing the priority at which the controller transfers uncopied data sets from the first storage device to the second storage device.

36. The article manufacture of claim 35, further comprising:

sending a message to the controller in response to detecting that the calculated percentage exceeds the first threshold to increase the priority associated with the uncopied data sets, wherein the controller increases the priority at which uncopied data sets are transferred from the first storage device to the second storage device in response to the message.

37. The article manufacture of claim 35, wherein the controller increases the priority associated with uncopied data sets by increasing the priority from a lower priority to a higher priority.

38. The article manufacture of claim 37, further comprising:

lowering, with the controller, the priority associated with uncopied data sets from the higher priority to the lower priority when the percentage of uncopied data sets in the first storage device falls below the first threshold.

39. The article manufacture of claim 38, further comprising:

sending a message to the controller in response to detecting that the calculated percentage is less than the first threshold to lower the priority associated with the uncopied data sets, wherein the controller lowers the priority at which uncopied data sets are transferred from the first storage device to the second storage device in response to the message.

40. An article of manufacture including code for maintaining data accessible by a host in a first and second storage devices, wherein the data is comprised of a plurality of data sets by:

determining a percentage of uncopied data in the first storage device, wherein uncopied data comprises data sets to be copied from the first storage device to the second storage device; and if the determined percentage is greater than a first threshold amount, increasing a rate at which uncopied data sets are transferred from the first storage device to the second storage device;

if the calculated percentage is greater than a second threshold amount, lowering a priority at which Input/Output (I/O) requests from a host to the first storage device are processed, wherein the priority is used to determine a rate at which Input/Output requests, including the requests to transfer the uncopied data and host I/O requests, are processed.

41. The article manufacture of claim 40, wherein a first controller manages I/O requests to the first storage device, wherein lowering the priority at which I/O requests from the host to the first storage device are processed is performed by the first controller.

42. The article manufacture of claim 41, wherein the first controller lowers the priority of host write I/O requests and not host read I/O requests.

43. The article manufacture of claim 41, wherein the first controller lowers the priority by delaying processing host I/O requests for a delay time.

44. The article manufacture of claim 43, further comprising:

dynamically calculating the delay time that is used to delay processing host I/O requests.

45. The article manufacture of claim 44, wherein the delay time is dynamically calculated as a function of the percentage of uncopied data sets in the first storage device.

* * * * *